Sept. 24, 1929.  T. A. BANNING, JR  1,729,144
METER AND THE LIKE
Filed Oct. 24, 1925  3 Sheets-Sheet 1

Inventor:
Thomas A. Banning Jr.

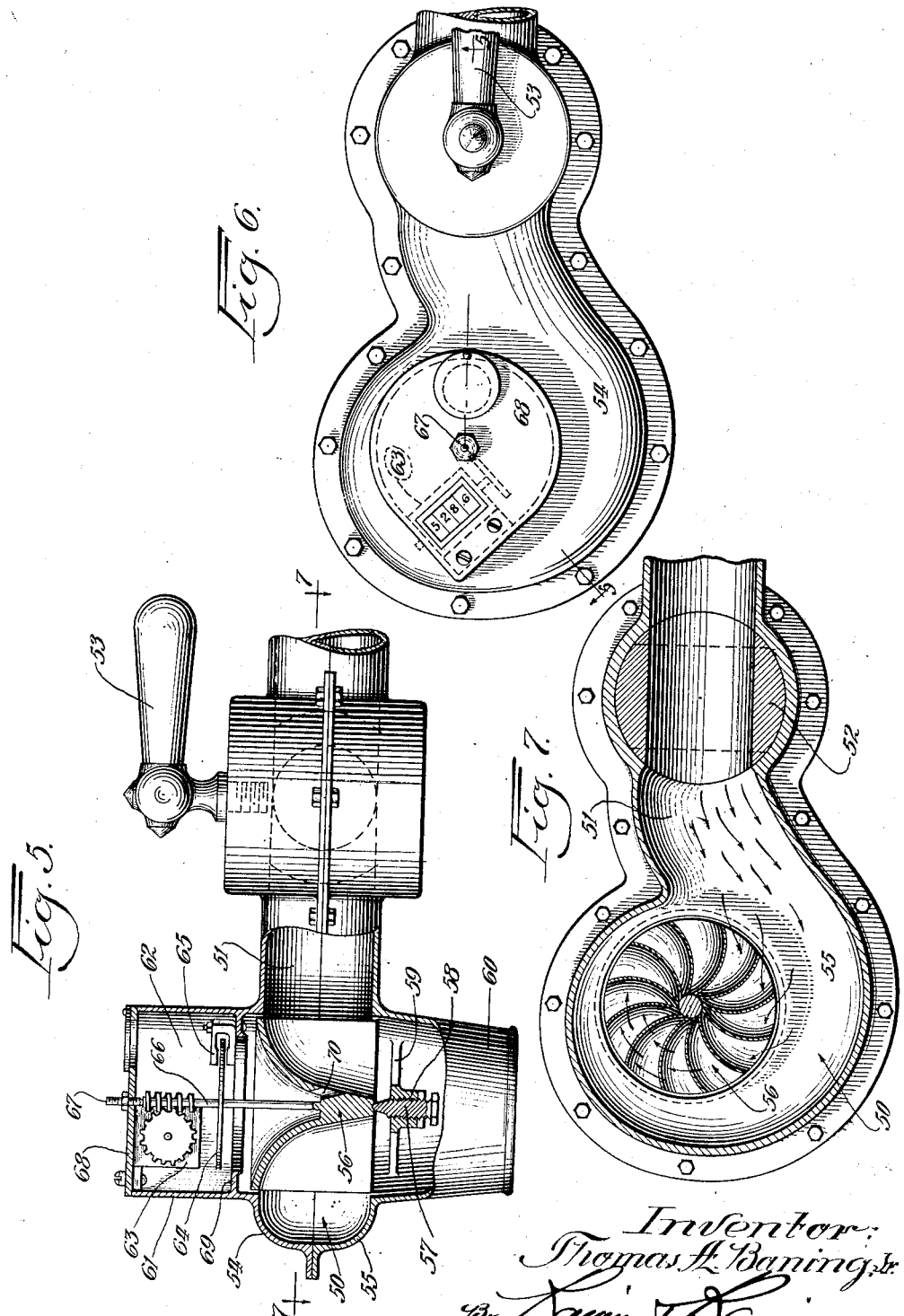

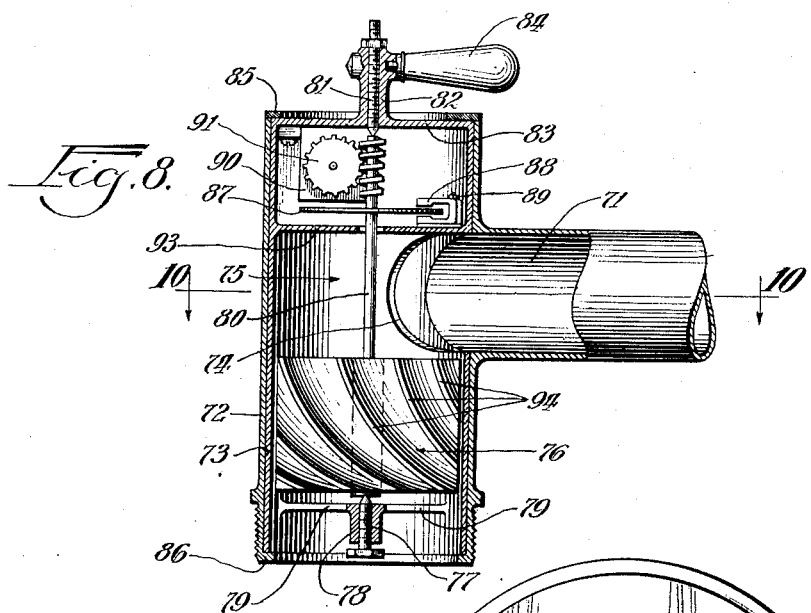

Patented Sept. 24, 1929

1,729,144

UNITED STATES PATENT OFFICE

THOMAS A. BANNING, JR., OF WILMETTE, ILLINOIS

METER AND THE LIKE

Application filed October 24, 1925. Serial No. 64,557.

This invention has to do with improvements in meters for measuring the flow of relatively large volumes of liquid, ordinarily under relatively low pressure. In some cases, however, the devices of the present invention may also be used for measuring the flow of liquid under considerable pressure.

One of the features of the invention relates to the provision of meters particularly adapted for measuring the flow of liquids, such as, gasoline, fuel oil, etc., as they are delivered into or out of tanks. In this connection, it is an object to provide a device of such construction that it will be very well adapted for measuring the gasoline as it is delivered into the tank of an automobile or the like; or for measuring the fuel oil as it is delivered into the supply tank of an oil burning system for residence heating, etc.; and also a type of meter which is very well adapted for use in measuring the oil or gasoline as it is run off from a supply tank, such as a storage tank or tank wagon. It will also appear that there are many useful applications of the features of the invention.

One of the objects of the invention is to provide a metering device of such construction as to establish a passage of very large capacity within a device of small size and simple construction; and more particularly to provide a device in which the passages through the metering element itself shall be of practically full size, as compared to the passages of the adjoining conduits; and to accomplish this result by the use of a structure of which the size, at the position of the metering device, shall not substantially be larger than the main portions of the conduit.

More particularly it is an object to provide a turbine element for metering the flow of the liquid, the arrangement being such that the turbine revolutions are substantially in proportion to the volume of liquid passing through the device.

Another object of the invention is to so arrange the passages and metering element that there will be a practically unrestricted flow of liquid, so that the pressure head loss at the position of the metering device will be negligible.

Another feature of the invention relates to the provision of a device which shall be substantially correct and accurate in its operations throughout a very wide range of rates of flow, so that for all ordinary and normal conditions of operation, the device shall be substantially accurate and reliable.

More particularly, it is an object to provide means for damping the revolutions of the device, so that the rotor will not overrun when the rate of flow is reduced, and also so that the rate of rotor rotation shall be at all times substantially proportional to the rate of liquid flow. As a consequence, the integrated rotor revolutions are at all times in direct proportion to the integrated total amount of liquid flow.

More particularly it is an object to provide a damping device in the form of a magnet, the poles of which embrace a disk of conducting material such as metal, thereby setting up eddy currents in the same in proportion to the rate of rotation. It is a further object to provide means for adjusting the position of said magnet with respect to the disk so as to make it possible to very easily calibrate the device and ensure accurate reading.

Other objects and uses of the invention will appear from a detailed description of the same, which consists in the features of construction and combinations of parts hereinafter described and claimed.

In the drawings:

Fig. 5 shows a side view of a modified form of device in which the metering device is directly associated with a cock and spout, such, for example, as used in connection with a tank wagon. Fig. 5 is also a section on the line 5—5 of Fig. 6, looking in the direction of the arrows;

Fig. 6 shows a top plan view corresponding to Fig. 5;

Fig. 7 shows a horizontal section on the line 7—7 of Fig. 5, looking in the direction of the arrows;

Fig. 8 shows a longitudinal section through another construction of device in which the metering element is built directly into the plug of a cock or faucet;

Fig. 9 shows a top plan view of the device of Fig. 8, on enlarged scale; and

Fig. 10 shows a horizontal section on the line 10—10 of Fig. 8, looking in the direction of the arrows.

Figure 1:
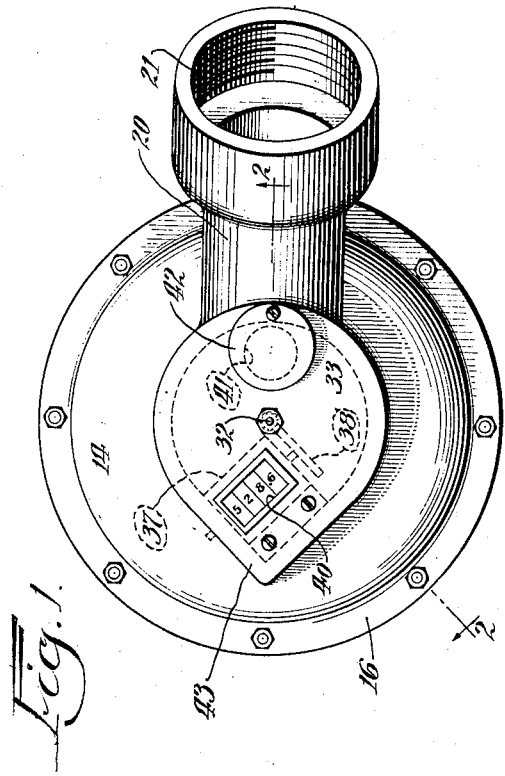
Figure 1 shows a plan view of one form of instrument embodying the features of the present invention.

Referring first to the construction shown in Figs. 1, 2, 3 and 4, the same is admirably adapted for metering the gasoline or other liquid as it is introduced into the tank of an automobile or other similar receptacle. This device is constructed as a self-contained unit which can be readily set into the filler opening of tanks already in service, and when in such position will not appreciably obstruct the free introduction of the liquid, nor present an unsightly and objectionably large appearance. The top of the tank or other receptacle is designated by the numeral 12. It is provided with the threaded throat 13 which, under previous practice, has directly received the filler cap.

The device illustrated in Figs. 1, 2, 3 and 4 includes a circular body structure including the top and bottom sections 14 and 15, respectively. These are joined together by the companion encircling flanges 16. The top section 14 is provided with a central chamber 17 within which are located the integrating and damping devices. Around this chamber 17 is an annular passage 18 separated from the chamber 17 by the partition 19.

A filler spout 20 leads directly into the passage 18 at one side, said spout being preferably provided with a threaded opening 21 which may be closed by a suitable plug. If desired, the opening 21 may be made of the same size and threading as the neck 13, so that the plug normally used in the neck 13 may be placed at the position of the threaded opening 21.

The section 15 is provided with an annular chamber immediately below the position of the chamber 18, and into which the liquid rushes from the chamber 18. The chamber of the section 15 is preferably provided with a series of downwardly and forwardly curved vanes 22, as illustrated in Fig. 3, so that as the liquid rushes downward into the member 15, it is given a swirling or rotary motion in the direction of the arrows in Fig. 3.

Figure 3:
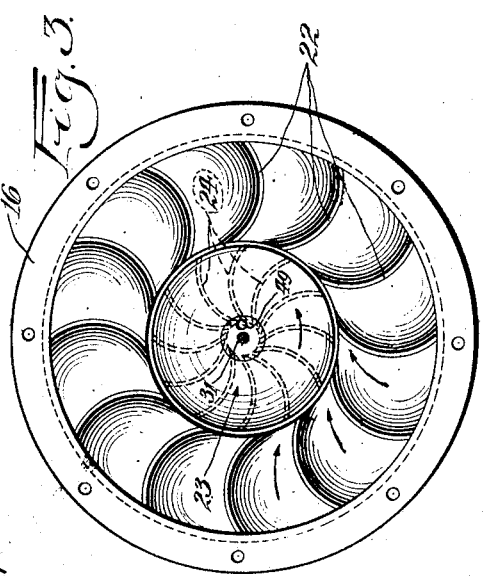
Fig. 3 shows a plan view on the line 3—3 of Fig. 2, looking in the direction of the arrows, looking down.

Within the central portion of the device is placed a small reaction turbine 23, the vanes 24 of which curve downwardly and backwardly with respect to the vanes 22, already referred to, so that the liquid rushing into the turbine will compel the same to rotate in the direction of the arrow in Fig. 3. At the same time, this liquid is delivered directly downwards with a practically clear and unobstructed path of flow.

The turbine 23 is preferably mounted on a ball step bearing 25, the elevation of which may be adjusted by a machine screw 26, the position of which may be locked by a lock nut 27. This machine screw is carried in a small central hub 28 supported by the radial arms 29 from the threaded flange 30 which reaches downward from the body section 15 and may be threaded into the collar 13.

The turbine is provided with a small vertical shaft 31, the upper end of which is supported by a pin bearing 32 in the cap 33. By proper manipulation of the machine screw 26 and the pin bearing 32, the turbine may be set up or down for proper adjustment while at the same time permitting it to rotate freely.

Mounted on the shaft 31 is a thin disk 34 of iron, steel, aluminum, copper, brass or other suitable metal; and a permanent magnet 35 has its poles embracing the edge of the disk, so that the flux of the magnet passes through the disk. Consequently, the rotation of the disk due to the rotation of the turbine will generate eddy currents in the disk which in turn will react upon the magnet and retard its rotation. It will be found that this retarding action is proportional to the speed of the disk, and that by properly setting the parts, the turbine will rotate in exact proportion to the quantity of liquid delivered thereto. In other words, the integrated number of turbine revolutions will be in proportion to the quantity of liquid delivered thereto. The above condition will be maintained irrespective of the rate of liquid delivery through a wide range of rates, so that the device will integrate accurately notwithstanding change of momentary rate of liquid flow throughout considerable ranges of rate of flow.

The magnet is preferably mounted on a pivotal mounting, so that by loosening up the nut 36 the magnet may be turned so as to embrace the edge of the disk to a greater or less extent, thus allowing for proper calibration of the device.

The number of turbine revolutions may be integrated in any convenient manner, as, for example, by a counting device 37 supported from the cover plate 33. Said counting device has a worm wheel 38 engaging the worm 39 on the shaft 31. The cover 33 is preferably provided with an opening 40 through which the readings of the counting device are visible, as shown in Fig. 1, and preferably this opening 40 is protected by a suitable window of glass or the like. If desired, the cover 33 may be provided with a supplemental opening 41 above the position of the magnet 35, said opening 41 being protected by a cover plate 42. This will permit ready access to the magnet for calibration.

Figure 4:
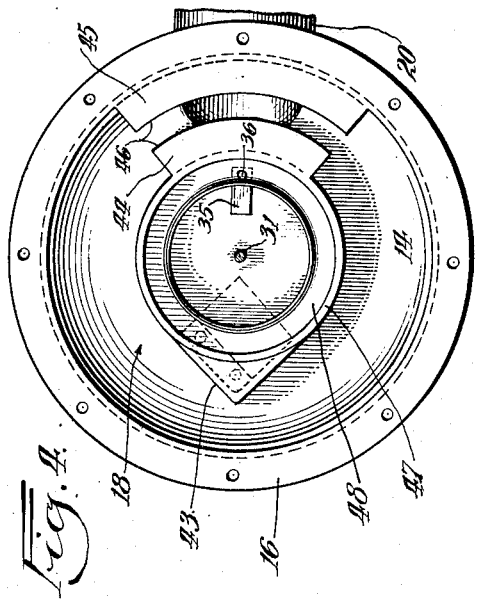
Fig. 4 shows a plan view on the line 4—4 of Fig. 2, looking up.

It will be noted from comparison of Figs. 1 and 4 that the partition 19 is circular around three-fourths of its periphery, but is provided with an angular enlargement 43 at one side. This is for the accommodation of the counting device 37, as clearly evident from Fig. 1. At the same time, this enlargement is placed directly opposite to the filler spout 20, so that it will not prevent the proper equalized delivery of liquid around the passage 18.

It is preferred that a baffle or series of baffles 44 and 45 be placed in the upper section 14 directly beneath the filler spout 20, so that as the liquid is introduced, it will be more effectively distributed around the entire passage 18. Preferably a slotted opening 46 is established between the baffles 44 and 45 so as to allow a proper amount of liquid to flow directly down, the remaining portion being splashed off to the sides and thus distributed.

Figure 2:
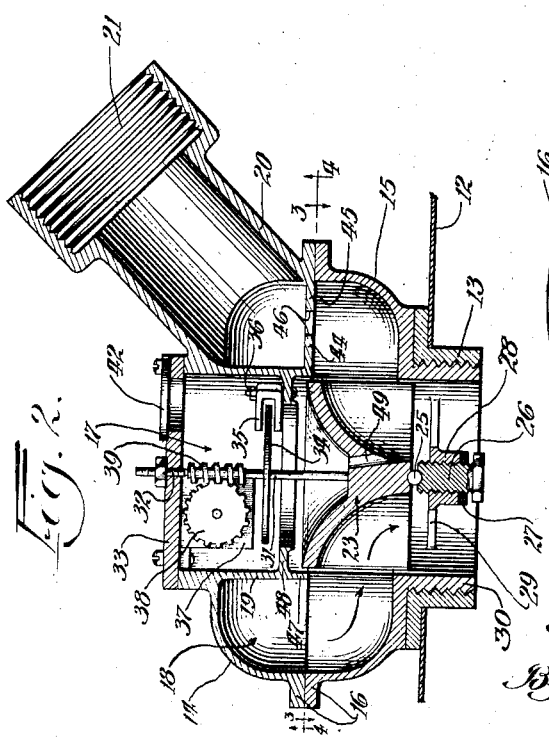
Fig. 2 shows a cross section on the line 2—2 of Fig. 1, looking in the direction of the arrows.

The turbine 23 has its upper end working in relatively close engagement with the lower portion of the partition 19 or a flange 47 depending therefrom. Nevertheless, the turbine should turn freely and without obstruction. In case a slight amount of liquid should leak up past the turbine, it will be deflected down again by an annular flange 48 on the partition 19, but which flange is centrally tapered down, so that such liquid will drip down onto the top of the turbine. Preferably, the top of the turbine is dished down, as shown in Fig. 2, so as to make the rotating element as light as possible. At the same time, the liquid dripping back onto the top of the turbine will work its way in centrally and may be delivered down through a drain opening 49 along with the body of the liquid flowing into the tank. It will be noted that the turbine illustrated in Figs. 1, 2, 3 and 4 is of the inflow reaction type.

Referring to Figs. 5, 6 and 7, in this case, I have provided only a single passage 50 which is of spiral shape and receives the body of liquid directly from the inlet passage 51 and under control of a cock 52. Said cock has a handle 53 by which the liquid is controlled. The passages 50 and 51 are established by the upper and lower body sections 54 and 55 joined together along a horizontal plane. These sections are so formed that together they establish the desired passages.

Located within the spiral passage 50 is a small inflow reaction turbine 56. The same is carried by the lower step bearing 57 threaded up through a small hub 58 which is supported by a series of radial arms 59 in the lower body section 55. Said body section preferably is provided with a liquid delivery spout 60 immediately below the position of the turbine and into which the liquid is directly delivered. In such case also the arms 59 are conveniently built into the upper portion of this spout.

The upper section 54 is provided with a top enlargement 61 above the position of the turbine and establishing a chamber 62. This chamber contains the integrating device 63, damper disk 64, damper magnet 65, and other related parts. Likewise, the upwardly extending shaft 66 from the turbine is supported by the pin bearing 67 in the cover plate 68.

The flange 69 is also provided which reaches inwards from the chamber 61 and serves to catch any liquid which may work upwards past the turbine so as to cause return of said liquid down through the central turbine opening 70.

It will be noted that in the case of Figs. 5, 6 and 7, the turbine vanes are so formed as to directly receive the liquid which is delivered to them from the spiral passage 60 and in such a manner that the turbine is compelled to rotate proportionally to the quantity of liquid so delivered. In the present case, also, the number of turbine revolutions is proportional to the quantity of liquid delivered throughout a wide range of rates of flow. The damper magnet 65 serves to permit proper calibration of the device.

Referring to the construction shown in Figs. 8, 9 and 10, in this case the metering element has been combined directly with the shut off faucet or cock itself. In this case, the oil or other liquid from the pipe 71 is delivered to the vertical cylindrical body member 72. Within the latter there is rotatably mounted the valve sleeve 73 having in its upper portion a port 74 for control of admission of liquid from the passage 71. This liquid thus enters a chamber 75 within the sleeve 73 and in alignment with the port 74.

Beneath the chamber 75 is the turbine element 76 working within the sleeve 73. This turbine element is supported by a pin bearing at its lower end including the pin 77 working through a hub 78 carried by the radial arms 79 in the lower portion of the valve sleeve.

A light shaft 80 leads upward from the turbine element to the pin bearing at its upper end including the pin 81. This pin is threaded into a boss 82 which reaches upwards from the partition 83 closing the upper end of the sleeve 73. By adjustment of the pins 77 and 81 the vertical position of the turbine and shaft 70 may be adjusted.

A handle 84 is secured to the boss 82, by means of which handle the valve is manipulated. A collar 85 is secured to the upper end of the body 72 and overlies the peripheral portion of the top partition 83, so as to retain the valve sleeve 73 in place. The lower end of said valve sleeve rests against an inturned flange 86 on the lower end of the body member 72.

The damper disk 87 is provided on the shaft 80, the same being made of suitable metal, such as iron, steel, aluminum, copper or brass, and the permanent magnet 88 has its poles embracing the edge portion of the disk 87. This magnet may be adjusted on the pivotal point 89, as already explained with respect to the other constructions.

An integrating device 90 is secured against the bottom face of the top partition 83, the same being driven by a worm gear drive 91 from the shaft 80. The partition 83 is provided with a window 92 directly above the integrating device, so that the reading can be easily made. This window is preferably covered with glass or other transparent material.

It will be noted that in turning the handle 84 to control the valve opening, the integrating device also turns therewith, as well as the upper and lower bearings for the turbine. If the turbine should be at rest during the opening or closing movement of the valve, the integrator reading would be shifted very slightly, but such change would be inappreciable and would not effect the accuracy of the device appreciably.

It will be noted that the liquid entering the valve sleeve 73 passes downwards directly to the turbine 76. Any hydrostatic pressure existing within the chamber 75 might tend to cause the liquid to rise towards the disk 87, but such rise would be resisted by the compression of the air entrapped in the upper portion of the valve sleeve. This air is so trapped because the partition 83 and closure for the window 92 establish an air seal. By placing the disk 87 as high up as possible, the danger of actual contact with liquid is greatly reduced.

In order to still further ensure against rise of liquid towards the disk and the integrating mechanism, I prefer to place a partition 93 across the valve sleeve 73 immediately above the opening 74, but this partition when used preferably has a sufficiently large opening for the shaft 80 to avoid friction therewith.

The turbine 76 is of the axial flow type, its vanes 94 being so curved as to operate on the reaction principle with axial flow of liquid. Furthermore, this turbine is of proper size to practically enclose the full passage of the sleeve 73 without actual contact or friction therewith.

It will be noted that the drag created on the disk 87 is directly proportional to the speed of rotation thereof, since the eddy currents set up in the disk are proportional to the electromotive force generated which in turn is proportional to the speed of the disk. Furthermore, that the reaction on the turbine blades is directly proportional to the volume discharged against said blades per unit of time, in other words, the rate of liquid flow. Under these circumstances, the speed of the turbine will also be directly proportional to the rate of liquid flow, and whenever the rate of liquid flow changes the speed will immediately either increase or decrease to the correct point.

By making the turbine and other rotating parts relatively light, it is possible to get almost instantaneous response with changes of rate of liquid flow, so that the device will very quickly follow such changes. It will also be noted that the static head of the liquid will be negligible, since the liquid is being freely discharged to the tank or other receptacle receiving it.

Devices embodying the features of the present invention are admirably adapted for use in connection with liquid delivered from tank wagons and similar containers, since the dynamic head is very small in such cases and will be a negligible factor in the operation of the device.

This application as respects certain features thereof is a continuation in part of my co-pending application for Letters Patent of the United States on fuel feeding and metering systems, Serial No. 43,117, which was filed July 13, 1925.

While I have herein shown and described only certain embodiments of the features of my present invention, still I do not intend to limit myself to the same, except as I may do so in the claims.

I claim:

1. In combination with a fuel supply tank with a filler opening, a fuel supply meter for said tank, said meter comprising a casing, a flange thereon for insertion into said filler opening, a reaction turbine in said casing, there being a fuel delivery opening in said casing, means for directing the fuel from said opening through the reaction turbine effectively to rotate the same as fuel is introduced, an electromagnetic damper having a disk connected to the turbine and rotating therewith, a permanent magnet having its poles embracing the edge of the disk, operable effectively to damp the rotations of the disk and turbine, means for adjustably securing said magnet relatively to the edge of the disk, and suitable counting mechanism in conjunction with the turbine operable effectively to integrate the revolutions thereof in terms of quantity of fuel flowing through the meter, substantially as described.

2. As a new article of manufacture, a liquid metering device for the purpose specified including a circular casing having a peripheral passage in its upper portion, there being a filler opening communicating with said passage, and there being a central bottom discharge opening, a reaction turbine mounted for rotation about a vertical axis within said casing, the turbine having an inlet opening communicating with said peripheral passage and having a central discharge opening communicating with the central discharge opening of the casing, a horizontal damper disk operatively connected with and located above the turbine, a permanent magnet having its poles embracing the edge portion of the disk, and an adjustable mounting for said magnet whereby the magnet poles may be adjusted with respect to the disk, means for indicating amount of liquid flow in terms of revolutions of the turbine, and driving connections between the turbine and said indicating means, substantially as described.

3. As a new article of manufacture, a liquid metering device for the purpose specified including a circular casing having a peripheral passage in its upper portion, there being a filler opening communicating with said passage and there being a central bottom discharge openng, a reaction turbine mounted for rotation about a vertical axis within said casing, the turbine having inlet openings communicating with said peripheral passage and having discharge openings communicating with the discharge opening of the casing, a horizontal damper disk, operatively connected with and located above the turbine, a permanent magnet having its poles embracing the edge portion of the disk, means for indicating amount of liquid flow in terms of revolutions of the turbine, and driving connections between the turbine and said indicating means, substantially as described.

4. In a device of the class described, the combination of a member having a liquid passage, means for delivering liquid to said passage, a reaction turbine fully occupying said passage and mounted for rotation therein about an axis extending longitudinally of said passage and adapted to discharge liquid axially with respect to said passage, means for integrating amount of liquid flow in proportion to turbine revolutions, driving connections between the turbine and said integrating means, a metal disk rotating with the turbine, and a permanent magnet having its poles embracing the edge portion of the disk, substantially as described.

THOMAS A. BANNING, JR.